Jan. 5, 1926.
A. S. REYNOLDS
CUT-OFF
Filed June 27, 1923
1,568,531
2 Sheets-Sheet 1
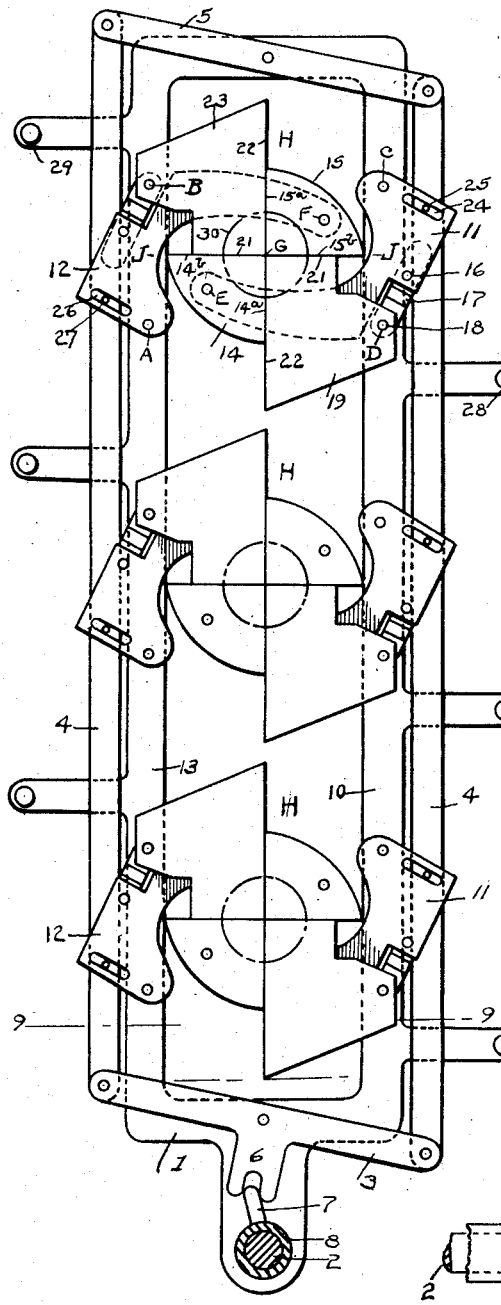
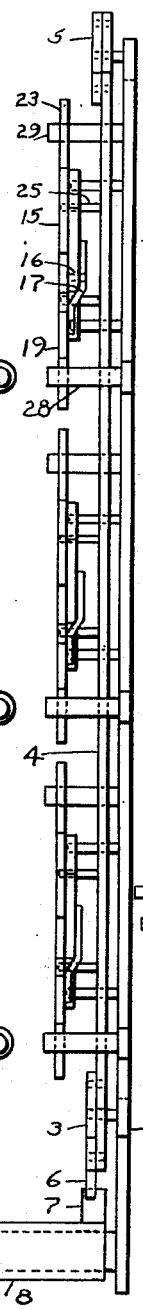
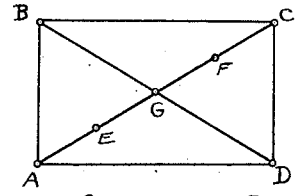
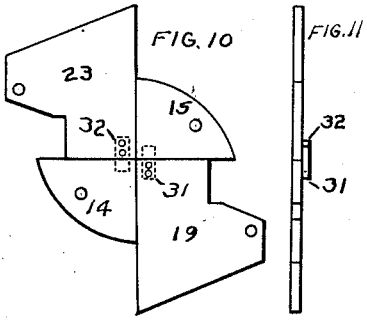
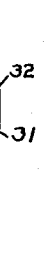
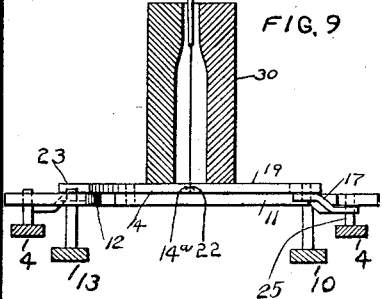

Jan. 5, 1926.  1,568,531
A. S. REYNOLDS
CUT-OFF
Filed June 27, 1923   2 Sheets-Sheet 2
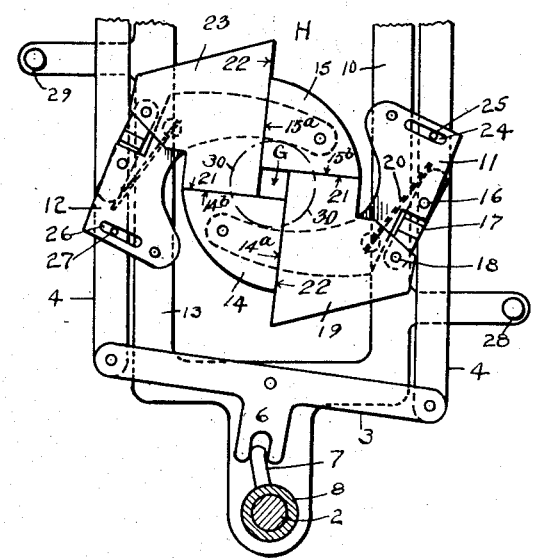
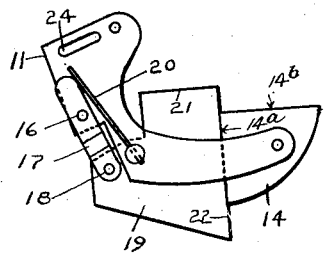
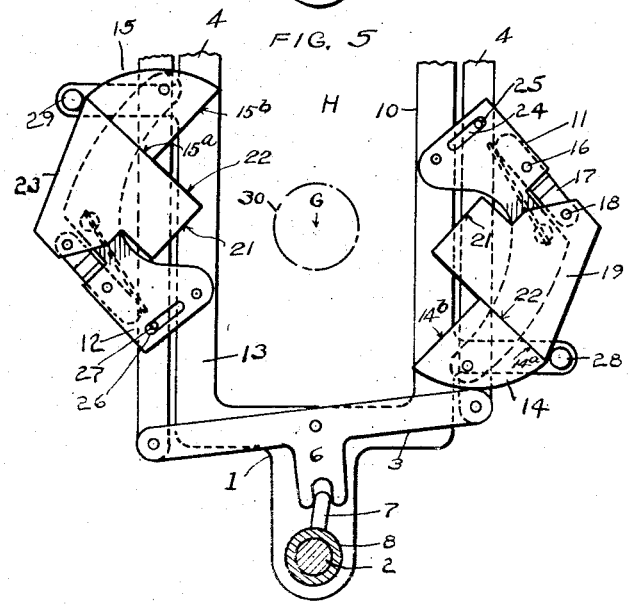
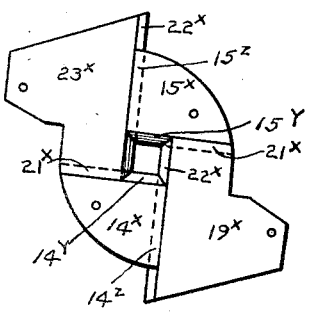

Patented Jan. 5, 1926.

1,568,531

UNITED STATES PATENT OFFICE.

ANITA S. REYNOLDS, OF GREENWICH, CONNECTICUT.

CUT-OFF.

Application filed June 27, 1923. Serial No. 648,106.

*To all whom it may concern:*

Be it known that I, ANITA S. REYNOLDS, a citizen of the United States, and a resident of Greenwich, county of Fairfield, and State of Connecticut, have invented a certain new and useful Cut-Off, of which the following is a specification.

The invention relates primarily to apparatus for closing an opening, and specifically to effecting the closing of the opening in such a manner that the center of the opening will be the finish of the closing movement.

More particularly, the invention relates to means for mounting and operating an apparatus for the purpose specified, in which parts forming the closure will, when in operative position, move in the same plane.

The invention is especially designed to operate in conjunction with a glass bottle making machine, for closing the bottom of the blank mold and at the same time severing the molten glass in the blank mold from the pool of molten glass in the melting pot or the like.

In one type of automatic bottle making machine in common use, a bottomless, empty blank mold is depressed to the surface of a pool of molten glass, and by withdrawing the air from the mold, the latter will be filled with the molten glass. The mold is then raised a short distance above the surface of the pool. A column of the molten material connects the mass in the mold and the pool. By moving a knife horizontally relatively to the mold, the column is cut off on the plane of the bottom of the mold.

The comparatively cold knife coming in contact with the molten glass at one side of the column, will chill the lower edges of the glass in the blank mold and will leave a roughened edge or "scar" in the bottom of the finished product. This is occasioned by the fact that the knife enters the more or less cylindrical column at one side thereof and the column is finally severed at the opposite side. The cooler portions of the knife which extend beyond the periphery of the column will chill the periphery of the circle through which it cuts and the glass at the periphery will harden before the glass at the center of circle, and when the blank is removed from the mold, it will have a more or less annular ridge projecting from the bottom thereof, and the said ridge will be thicker and more pronounced on the side at which the knife leaves the column. By dragging the knife across the mold the molten mass will also be crowded over the bottom by the knife, and the final operation of the knife will be to break the column off.

This ridge will be more or less jagged, and may prevent the bottle when formed, from standing squarely on its base, and will also make it dangerous to handle.

The object of the present invention is to provide a closure mechanism comprising a plurality of movable members which will in one position of the apparatus form a flat surface in which there will be no openings between the members.

Another object is to provide means whereby a closing movement of the members will form the boundaries of an opening, which boundaries will be reduced toward a common center until the opening is obliterated, and a flat, plane surface will be produced without openings between the members.

A further object of the invention is to provide means whereby the column will be cut from the outside to the center thereof; whereby any crowding will be toward the center of the mold where the glass is hottest; to provide means whereby the cutting device will form the base against which the article is blown, and to provide means whereby the said bottom will be a plane surface and devoid of gaps, cracks, seams, or other spaces; and to provide means whereby the cutting or severing device may be moved from beneath the mold whereby the latter may be again dipped into the pool of molten glass.

These and further objects will more fully appear in the following specification and accompanying drawings considered together or separately.

One embodiment of the invention is illustrated in the accompanying drawings, in which like parts in the several figures are designated by corresponding characters of reference, and in which Fig. 1 is a top plan view showing a plurality of the devices of the invention, and illustrating the closure members or blades in closed position.

Fig. 2 is an edge view of the same.

Fig. 3 is a diagram illustrating the relative positions of the pivotal points of the blades when the latter are in closed position.

Fig. 4 is a top plan view showing the blades in partly closed position.

Fig. 5 is a similar view showing the blades in wide open position.

Fig. 6 is a bottom plan view of a single blade member.

Fig. 7 is an edge view of a modified form of blading.

Fig. 8 is a bottom plan view of the same.

Fig. 9 is a section of the line 9—9 of Fig. 1 with a blank mold in position.

Figs. 10 and 11 are plan and edge views of a modified form of blading.

In the embodiment of the invention illustrated, 1 designates an open rectangular frame member adapted to be supported over a pot or other receptacle (not shown) containing a pool of molten glass. The frame is illustrated as rigidly supported on a post 2 which, in turn, may be carried by any suitable means above the pool.

Pivoted at its center to one end of the frame 1 is a rocker arm 3, and pivoted to each end of the arm is a pitman 4. The opposite ends of the pitmen are pivoted respectively to the ends of a cross-bar 5, which latter is pivoted at its center to that end of the frame 1 opposite to the rocker arm 3.

Projecting from the rocker arm 3 is a forked element 6 between the tines of which engages a finger 7 carried by a sleeve 8 mounted on and rotatable relatively to the post 2. The sleeve 8 may be oscillated by any desired mechanism, and the post 2 may be oscillated in any desired manner, whereby the frame 1, and its appurtenances may be swung from its position above the pool of molten glass.

Carried on each frame 1 is preferably a plurality of cut-off devices H which are identical in design and operation, and a description of one will suffice for all.

Pivoted to the side rail 10 of the frame 1 is an angle lever 11, and a similar lever 12 is pivoted on the side rail 13 of the frame. The levers 11 and 12 are reversed relatively to each other in that they extend in opposite directions from their pivotal points.

Pivoted to the free end of the lever 11 is a blade element 14 having two of its edges at right angles to each other, and a similar blade element 15 is pivoted to the free end of the lever 12. When the cut-off members are in the closed position, as shown in Fig. 1, the pivotal points A and C of the levers 11 and 12, the pivotal points E and F of the elements 14 and 15, and the angular points G of the elements will be in alinement, the line being diagonal to the longitudinal center line of the frame 1 with the point G midway between the points A and C, the point E midway between A and G, and the point F midway between G and C.

Pivoted at 16 to the lever 11 is a link 17. The pivot 16 is at about the middle of the link and to one end thereof is pivoted at 18 a blade member 19. A spring 20 carried by the lever 11 presses against the opposite, free end of the link 11 as shown particularly in Figs. 4 and 6.

The member 19 has two right angle edges 21 and 22, the latter, when the device is in the closed position, extends in line with the longitudinal center of the frame 1. A blade member 23 is similarly carried by the lever 12. The upper surfaces of the elements 14 and 15 and of the members 19 and 23 are on the same horizontal plane whereby when the parts are in the position illustrated in Figs. 1 and 9 a flush top table or support will be formed.

The lever 11 is provided with a slot 24 extending at approximately right angles to the line of the pivots 16 and 18, and engaging said slot is a pin 25 carried by the pitman 4. The lever 12 is provided with a similar slot 26 with which a pin 27 carried by the pitman 4 at the opposite side of the frame 1 engages.

Carried on the side rail 10 of the frame 1 is a stop 28 in the path of movement of the lever 11, and a stop 29 carried by the rail 13 is located in the path of movement of the lever 12.

When it is desired to move the blading so as to break the continuity of the table or support, the sleeve 8 is rotated in the clockwise direction. This will move the pitman 4 in opposite directions. The pins or studs 25 and 27 operating in their respective slots 24 and 26 in the levers 11 and 12, will cause the latter to swing outwardly, on their pivots C and A, from the center line of the frame 1, and cause the angular points of the blade elements and members to be moved away from the central point G.

As the movement proceeds the levers 11 and 12 will bring the members 19 and 23 into contact with the stops 28 and 29 respectively. This will arrest the outward movement of the members, but the continued outward movement of the levers 11 and 12 will cause the elements 14 and 15 to slide outwardly along the edges of the members to the positions shown in Fig. 5, and the elements and members will be in position to engage each other when the movement of the sleeve 8 is reversed.

In this position the space between the rails 10 and 13 of the frame 1 will be clear and the mold, and its appurtenances may be passed downward through the frame whereby its lower end may be dipped into the mass of molten glass of the pool below.

When the air is withdrawn from the mold through its upper end, molten glass from the pool will be forced upward into and filling the mold, and the mold will be raised so that its lower, open end is on approximately the plane of the upper surfaces of the elements 14 and 15 and the members 19 and 23.

Because of the tenacity of the molten glass there will be a column of the same extending from the surface of the pool to the bottom of the mass in the mold, or in some cases the column may become attenuated to the breaking point leaving a stalactite tail of molten glass depending from the bottom of the mass in the mold.

The sleeve 8 is now rotated in the counter clockwise direction, and, by the engagement of the finger 7 with the fork 6, the bar 3, and with it the bar 5, will be rotated in the clock-wise direction, and the levers 11 and 12, and the elements carried thereby, will be moved to the closed position as shown in Fig. 1.

As the cutting devices approach the closed position the floating connections of the members 19 and 23, and the pivotal connections of the elements 14 and 15, with the levers 11 and 12 respectively will always retain the sides 14$^a$ and 15$^a$ of the elements 14 and 15 in engagement with the sides 22 of the members 19 and 23 respectively, and the side 14$^b$ of the element 14 with the side 21 of the member 23, and the side 15$^b$ of the element 15 with the side 21 of the member 19 whereby the opening formed by the elements and members will always be rectangular, and there will be no other openings between the parts.

As the parts approach the positions shown in Figs. 1 and 2 the column of fused glass will be gradually severed from the mass in the mold, and the cutting will always be toward the center of the column which is naturally the hottest and most fluid part thereof.

As the column is cut off by devices moving toward a common center, there will be no tendency to leave a scar on the bottom of the finished bottle for the reason that any surplus glass in the tail and which may not have been cut off will, because of the fluidity of mass, be forced upward into the mass in the mold.

When the elements and members reach the position shown in Fig. 1 they are in contact with the open lower face of the mold, and the preliminary blowing may be done in the mold and against the bottom thus formed.

In the modification illustrated in Figs. 7 and 8 the members 14$^x$, 15$^x$, 19$^x$ and 23$^x$ are similar to the corresponding members in the preceding figures, except that edges 14$^y$, and 14$^z$, 15$^y$, and 15$^z$, 21$^x$ and 22$^x$ are beveled as shown, whereby sharp cutting edges will be presented to the molten column as the cut-off is moved toward the closed position.

In the modification as illustrated in Figs. 10 and 11 the blade members 19 and 23 are provided with guide plates 31 and 32 respectively. These plates engage beneath the elements 14 and 15 respectively as the device closes, and are for the purpose of assisting in maintaining the elements and members in the same plane.

The apparatus has been described and illustrated for use in connection with an automatic bottle making machine, in which the molten glass is gathered, and the preliminary blowing is accomplished, in a blank forming mold, and the final blowing in another mold. As the cutting off process is carried out in connection with the first or blank mold, that is all that has been illustrated and described.

While the apparatus has been described in connection with a bottle making machine it is to be understood that the invention may be utilized in many other situations, as in measuring devices or the like, for example.

What I claim is:

1. A closure comprising four members each adapted to form one side only to define a rectangular opening, and means for moving the members at right angles to each other to obliterate the opening.

2. A closure comprising four members each adapted to form one side only to define a rectangular opening, said members being in the same plane, and means for moving the members in straight lines to obliterate the opening.

3. A closure, comprising a plurality of pivoted devices in opposed relation, each device carrying a plurality of members, and means for moving said devices to bring the members into juxtaposition to form the boundaries of a rectangular opening.

4. A closure, comprising a plurality of pivoted devices in opposed relation, each device carrying a plurality of members, and means for moving said devices to bring the members into juxtaposition to form the boundaries of a rectangular opening and by continued movement to close said opening, each of said members being in engagement with the adjacent members during the closing movement.

5. A closure comprising four members grouped to define a rectangular opening, one side of each member forming a side of the opening, and means for sliding the members toward the center of the opening to obliterate the same.

6. A closure comprising four members grouped to define a rectangular opening, one side of each member forming a side of the opening, each member engaging two other members and means for sliding the members toward the center of the opening to obliterate the same.

7. A closure comprising four members grouped to define a rectangular opening, one side of each member forming a side of the opening, each member engaging two other members and means for sliding the members toward the center of the opening to obliterate the same, each member maintaining its engagement with the two other members during the closing operation.

8. A closure comprising four members, each member having two edges of each member engaging an edge of two other members, the apices of the members being separated to form a rectangular opening, and means for sliding each member along the edges of its engaging member to obliterate the opening.

9. A closure comprising four plate-like members, each member being pivoted relatively to each other member, each member having two edges at right angles to each other, each engaging an edge of two other members to define a rectangular opening each member forming one side of the opening, and means for sliding all of the members relatively to each other to obliterate the opening.

10. A closure comprising four plate-like members each pivoted relatively the others, each member having two right angled edges, each of such edges having sliding contact with similar edges of another member whereby one edge only of each member will form one side defining a rectangular opening, and means for moving all of the contacting edges toward the center of the opening to obliterate the same and to form an unperforated platform having a plane surface.

11. Apparatus of the character described, comprising a mold open at its bottom, a pair of pivoted devices adapted to engage beneath the mold and form a closure therefor, each device comprising a plurality of independently pivoted elements, and means for pivoting the devices and elements to close the bottom of the mold.

12. Apparatus of the character described, comprising a mold open at its bottom, a pair of pivoted devices adapted to engage beneath the mold and form a closure therefor, each device comprising a plurality of independently pivoted elements, and means for pivoting the devices and elements to close the bottom of the mold, said elements moving toward the axial center line of the mold to form the closure.

13. Apparatus of the character described, comprising a pair of levers pivoted in opposed relation, each lever carrying a plurality of pivoted elements, and means for pivoting the levers toward each other whereby the elements will engage each other to form the boundaries of an angular opening.

14. Apparatus of the character described, comprising a pair of levers pivoted in opposed relation, each lever carrying a plurality of pivoted elements each having a straight side, and means for moving the levers toward each other whereby the elements will engage each other to form the boundaries of a rectangular opening.

15. Apparatus of the character described, comprising a pair of levers pivoted in opposed relation, an element movably secured to each lever, each element having right angle edges, a member carried by each lever, each of said members having a floating connection with its lever, each of said members having right angle edges, means for moving the levers whereby each of said members will engage each of said elements to form a rectangular opening, the continued movement of the levers causing all of the elements, and members to engage with each other and obliterate the opening.

16. Apparatus of the character described, comprising a pair of levers pivoted in opposed relation, an element movably secured to each lever, each element having right angle edges, a member carried by each lever, each of said members having a floating connection with its lever, each of said members having right angle edges, means for moving the levers whereby each of said members will engage each of said elements to form a rectangular opening, the continued movement of the levers causing all of the elements and members to engage with each other and obliterate the opening.

17. Apparatus of the character described, comprising, a pair of levers pivoted in opposed relation, an element pivoted to each lever, each element having right angle edges, a member carried by each lever, each of said members having an elastic floating connection with its lever, each of said members having right angle edges, means for moving the levers whereby each of said floating members will engage each of said elements to form a rectangular opening, the continued movement of the levers causing all of the elements and members to engage with each other and obliterate the opening.

18. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, a spring engaging each link and means for rocking the levers, whereby the members may move relatively to the levers and links and the elements may be moved relatively to the levers and members with one side of a member always in engagement with a side of the element on the same lever to form a bottom for the mold.

19. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, a spring engaging each link, and a reciprocating device engaging each lever to rock the same, whereby the members may move relatively to the levers and links and the elements may be moved relatively to the levers and members, one side of each member being always in engagement with a side of the element on the same lever to form a bottom for the mold.

20. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, a spring engaging each link, and a reciprocating device engaging each lever to rock the same whereby the members may move relatively to the levers and links and each element may be moved relatively to its lever and member and with one of its sides always in engagement with a side of the said member to form a bottom for the mold, said reciprocating devices being movable in opposite directions.

21. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, each member carrying a spring engaging its link, and a reciprocating device engaging each lever to rock the same whereby the members may move relatively to the levers and links and the elements may be moved relatively to the lever and members and with one of its sides always in engagement with a side of the member on the same lever to form a bottom for the mold, said reciprocating devices being moved in opposite directions, and stops for retarding the movement of the members in one direction.

22. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, a spring anchored to each member and engaging its link, and a reciprocating device engaging each lever to rock the same whereby the member may move relatively to the lever and link and the element may be moved relatively to the lever and member and with one of its sides always in engagement with a side of the member on the same lever to form a bottom for the mold, said reciprocating devices being moved in opposite directions, and stops carried by the frame for retarding and limiting the movement of the members in one direction.

23. Apparatus of the character described, comprising a bottomless mold, an open frame having parallel side rails, a lever pivoted on each rail, an element pivoted at the free extremity of each lever, said elements having right angle sides, a link pivoted to each lever, a member pivoted to each link, each of said members having right angle sides, a spring engaging each link, and a reciprocating device having a sliding connection with each lever to rock the same whereby the member may move relatively to the lever and link and the element may be moved relatively to the lever and member and with one of its sides always in engagement with a side of the member on the same lever to form a bottom for the mold.

24. Apparatus of the character described, comprising a bottomless mold, an open rectangular frame, a cut-off device pivoted to each side rail of the frame, the pivots of the devices being arranged diagonally of the center line of the frame, each device comprising a lever, an element and a member carried by the lever, each member having a floating pivotal connection with its lever, the element and member of each lever being in sliding engagement, a device engaging each lever, a rocker arm connecting the devices, and means for rocking the arm to cause the free ends of the levers to approach each other and engage the element of each lever with the member of the other lever to form a bottom for the mold.

25. Apparatus of the character described comprising a bottomless mold, a device adapted to form the bottom of the mold, said device comprising a plurality of flat bodies each having right angle edges, each of said bodies engaging two of said other bodies on their right angle edges, and means for sliding all of the bodies toward the apex of each of them, said bodies being in close contact during the sliding operation, the engaging edges of the bodies being beveled.

26. Apparatus of the character described, comprising a bottomless mold, a device adapted to form the bottom of the mold, said device comprising a plurality of flat bodies each having right angle edges, each of said bodies engaging two of said other bodies on their right angle edges, and means for sliding all of the bodies toward the apex of each of them, said bodies being in close contact during the sliding operation, the engaging edges of the bodies being beveled, one body of each pair being supported from below by the other body of the pair.

This specification signed and witnessed this 23rd day of June, 1923.

ANITA S. REYNOLDS.